United States Patent
Takala

(10) Patent No.: US 7,347,910 B2
(45) Date of Patent: Mar. 25, 2008

(54) METHOD FOR MANUFACTURING A CONTAINER END WALL OF LIGHTWEIGHT CONSTRUCTION AND A CONTAINER PROVIDED WITH SUCH AN END WALL

(75) Inventor: Seppo Takala, Belchatow (PL)

(73) Assignee: Oy KWH Pipe Ab (FI)

( * ) Notice: Subject to any disclaimer, the term of this patent is extended or adjusted under 35 U.S.C. 154(b) by 666 days.

(21) Appl. No.: 10/489,591

(22) PCT Filed: Sep. 18, 2002

(86) PCT No.: PCT/FI02/00741

§ 371 (c)(1),
(2), (4) Date: Aug. 3, 2004

(87) PCT Pub. No.: WO03/028980

PCT Pub. Date: Apr. 10, 2003

(65) Prior Publication Data

US 2005/0003118 A1    Jan. 6, 2005

(30) Foreign Application Priority Data

Oct. 3, 2001    (FI) .................................. 20011930

(51) Int. Cl.
*B29C 53/58* (2006.01)
*B29C 65/00* (2006.01)

(52) U.S. Cl. ........................ 156/143; 156/156; 156/267; 156/268; 156/304.2; 428/34.1; 138/154; 285/901

(58) Field of Classification Search ................ 156/191, 156/193, 194, 69, 158, 304.2, 143, 156, 267, 156/268; 428/34.1; 493/269, 287, 292; 138/94, 154; 29/33 D, DIG. 43; 285/901

See application file for complete search history.

(56) References Cited

U.S. PATENT DOCUMENTS

| | | | |
|---|---|---|---|
| 3,525,454 A * | 8/1970 | Frederiksen | 220/359.4 |
| 3,917,500 A * | 11/1975 | Petzetakis et al. | 156/195 |
| 4,263,084 A * | 4/1981 | Takala | 156/503 |
| 4,762,249 A * | 8/1988 | Fortuna et al. | 220/359.4 |
| 4,898,708 A * | 2/1990 | Holoubek et al. | 264/515 |
| 5,096,528 A * | 3/1992 | Durrenberger et al. | 156/211 |

(Continued)

FOREIGN PATENT DOCUMENTS

DE    2 228 713    1/1974

(Continued)

*Primary Examiner*—D. Lawrence Tarazano
*Assistant Examiner*—Michele Jacobson
(74) *Attorney, Agent, or Firm*—Connolly Bove Lodge & Hutz LLP

(57) ABSTRACT

A method for producing a lightweight end wall of a containers characterized by the following stages: manufacturing a large size lightweight thermoplastics tube by spirally winding and joining together a hollow profile of thermoplastics, cutting a piece from such a tube to form a pre-form of an end wall, heating the pre-form into a mouldable state, pressing the pre-form into a dome shaped piece between a male and a female mould-half, cooling the dome shaped piece while pressed between the mould-halves, maching-tooling the edges of the cooled piece to match the cross-sectional surface of the tube mantle, and joining the mantle and the end wall together by welding.

14 Claims, 3 Drawing Sheets

U.S. PATENT DOCUMENTS

Figure 2:
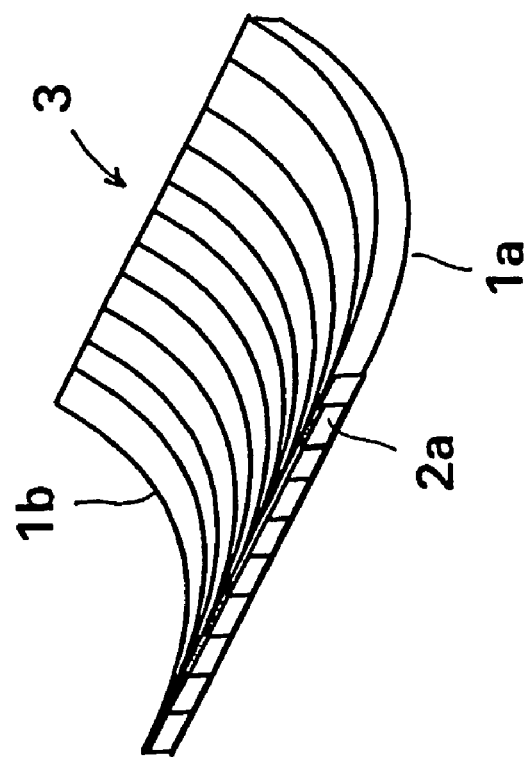

| | | | |
|---|---|---|---|
| 5,127,442 A * | 7/1992 | Blomqvist | 138/154 |
| 5,261,988 A * | 11/1993 | Dikis et al. | 156/244.13 |
| 5,553,753 A * | 9/1996 | Abplanalp | 222/387 |
| 5,591,292 A * | 1/1997 | Blomqvist | 156/244.13 |
| 6,105,649 A * | 8/2000 | Levingston et al. | 156/425 |
| 6,241,840 B1 * | 6/2001 | Pratt et al. | 156/172 |
| 6,306,235 B1 * | 10/2001 | Henderson | 156/195 |
| 6,488,802 B1 * | 12/2002 | Levingston et al. | 156/191 |
| 6,491,066 B1 * | 12/2002 | Pitman et al. | 138/109 |
| 6,666,945 B1 * | 12/2003 | Andtbacka et al. | 156/304.2 |
| 6,939,424 B1 * | 9/2005 | Takala et al. | 156/191 |

FOREIGN PATENT DOCUMENTS

| | | |
|---|---|---|
| DE | 28 02 180 | 7/1979 |
| DE | 37 10584 A1 | 10/1988 |
| FR | 2 607 434 A1 | 6/1988 |
| GB | 2 039 824 A | 8/1980 |
| JP | 59045113 | 3/1984 |
| WO | WO 0132401 A1 | 5/2001 |

\* cited by examiner

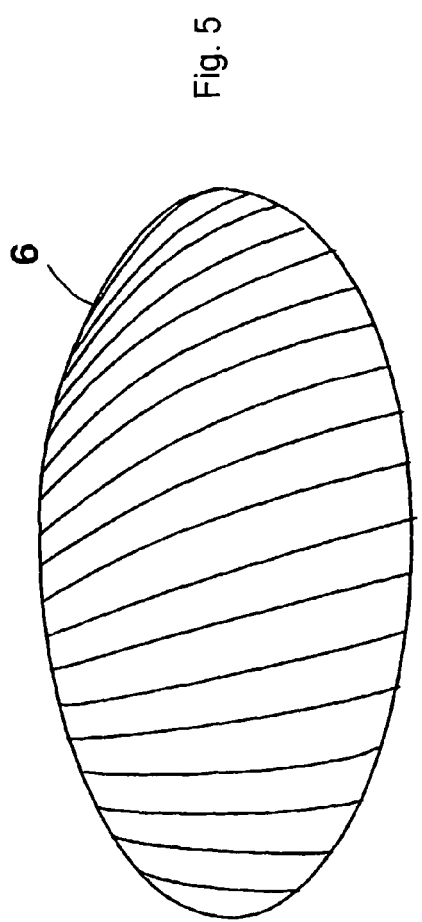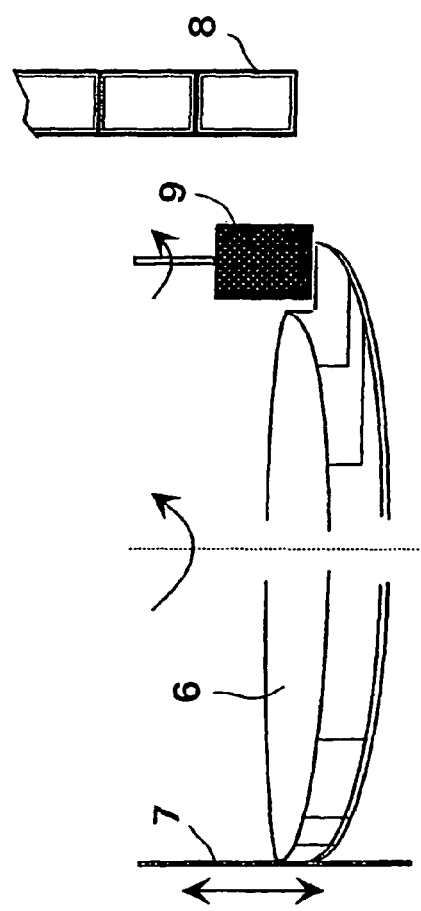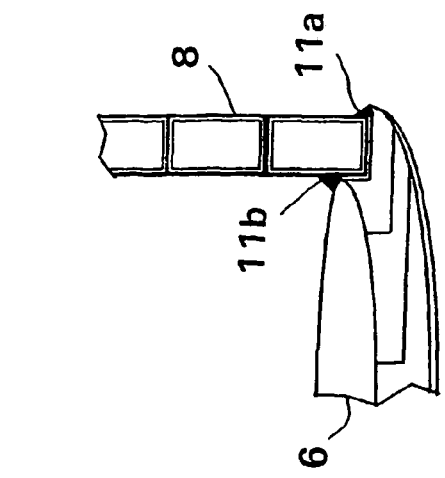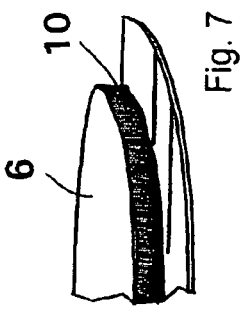

ns to this there is a tendency that in the convex surface concave
METHOD FOR MANUFACTURING A CONTAINER END WALL OF LIGHTWEIGHT CONSTRUCTION AND A CONTAINER PROVIDED WITH SUCH AN END WALL This invention concerns a method for manufacturing a container end wall of light-weight construction and a non-pressurized container of thermoplastics the mantle of which being a lightweight tube manufactured from a spirally wound hollow profile and the end wall of which is fixed by welding.

Previously the end walls for lightweight construction containers of thermoplastics were made of a planar disc, an armed planar disc, a single layer or an armed single layer dome. A disadvantage of these previously known end wall solutions is that the used plastics material have to be immoderately thick in order to achieve sufficient strength and stability, which increases the manufacturing costs and complicates the manufacturing process proper. When dome shaped end walls are used the material thickness can be somewhat decreased, but the consumption of plastics material is relatively high for each end wall. It has also been proposed that the end wall of a container is cylindrically curved, whereby it is manufactured from a mould shape, cut from the wall of a lightweight tube of same type as that forming the mantle of the container. After a specified straightening time the cut out piece is cut to form a piece intended to form fit with the container, which piece is welded to the inside surface of the mantle. Hereby a rigid mantle is achieved with a smaller material consumption than with the previously mentioned solutions, but net volume of the container will suffer to some extent and at the same time fitting of the form piece into the mantle is a difficult and time consuming operation.

Also, methods for heat moulding an extruded thermoplastics double sheet material in which between an inner layer and an outer layer of a double sheet material there are longitudinal channels separated form each other by partition walls are known. In order to prevent compression of these channels and to keep the outer surfaces as smooth as possible, for instance GB A 2 039 824 and DE A 2 802 180 propose that the ends of individual channels shall be closed by pressing them together before heat moulding, whereby air closed into the channels will prevent compression of the channels during heat moulding.

In order to facilitate moulding of a plastics material in plastic state DE A 2 228 713 proposes use of vacuum to achieve a drawing effect between the plastics material and the mould surface. According to FR A 2 607 434 vacuum is used between each of the two wall surfaces of the plastics material to be moulded and the mould halves, whereas according to DE A 3 710 584 no mould proper is used, but the edges of a piece to be moulded are kept fixed, and pressurized air is conducted to one side of the piece and into channels thereof, resulting in a dome shaped bulging of the piece to be moulded.

A common feature of the above mentioned known methods is that the sheets to be moulded are relative thin, and the object was mainly to produce skylight windows and glass domes for lamps. Any indication that the abovementioned methods could be used in producing container end walls cannot be found in any said documents. Further, thick double walled sheets cannot on the whole be produced by extrusion, so any starting material for such a heat moulding method is not available either.

The object of the present invention is to eliminate the abovementioned problems so that an easy and fast as well as material saving method for producing container end walls is achieved, and to achieve a container provided with such an end wall. This object is achieved with a method according to the present invention, which is characterized by the steps as follow:

producing a large size lightweight thermoplastic tube by spirally winding and joining together a hollow profile of thermoplastics;

cutting a piece from such a tube to form a pre-form of an end wall;

heating the pre-form into a mouldable state;

pressing the pre-form into a dome shaped piece between a male and a female mould-half;

cooling the dome shaped piece while pressed between the mould-halves;

machine-tooling the edges of the cooled piece to match the cross-sectional surface of the tube mantle, and joining the mantle and the end wall together by welding.

By the previously mentioned method a stable and lightweight container end wall is achieved easily and to favorable material costs, by means of which end wall net volume of a container can be maximized, production of which container is not possible by means of any previously known method.

Heating of the pre-form of an end wall to a plastic state is preferably carried out by means of an IR emitter or IR emitters, a convection oven or possibly by means of a heated mould. Heating can also be carried out by a combination of these. To heat large size pieces to a plastic state an effective and as uniform as possible heating is required so that all parts of a pre-form to be moulded are heated up in principle at the same time.

In order to secure that the whole surface of the pre-form will remain in contact with the mould surfaces when the mould halves are pressed together, so that the thickness of a ready dome shaped end wall is throughout equal and the partition walls between the longitudinal channels of the pre-form remain their height during the moulding stage, a vacuum is maintained between each side surface and the mould surface affecting said side surface.

During the moulding stage that wall of a relatively thick pre-form which is being moulded to a convex shape will be affected by pulling forces directed in the plane of said wall, while the wall being moulded to a concave shape will be compressed in the direction of the plane of said wall. Due to this there is a tendency that in the convex surface concaveness will appear at each longitudinal channel, so the convex surface will become more or less wavelike. In order to eliminate this effect one preferred embodiment of the invention proposes tensile stressing of the inner surface of the pre-form during the pressing stage.

According to one embodiment of the invention the mould halves are tempered during the moulding stage.

When the piece, moulded to a dome shape, has cooled, it is cut to a circular piece matching the outer mantle of the container, whereupon plastics material is removed from the edge area inside the outer wall of the end wall piece, along a strip corresponding to the thickness of the container mantle. Hereby an end wall piece is received, the outer wall of which will form a flange covering the whole end surface of the mantle, and the edge region of said end wall piece will protrude axially into the container in contact with the inner wall of the mantle a distance almost equal to the thickness of itself.

The end wall piece can preferably be provided with additional reinforcement before it is fixed to the mantle. Such an additional reinforcement is preferably a band surrounding the web region of the periphery of the end wall piece, which band can be of metal, of a composite material or the like. An annular groove for said reinforcement band can preferably be machine-tooled at the web region of the periphery of the end wall piece.

An end wall piece according to the invention is fixed to the mantle of the container preferably by both an inner and an outer welding seam. Welding can be carried out by a hand extruder, by an extrusion automat, by a friction welding, or electro welding method or possibly by butt welding.

The container according to the invention is characterized in that the end wall of it is mould pressed to dome shape and cut, from a lightweight tube of a same type as the tube forming the mantle of the container, to a form corresponding to the end surface of said tube.

In the end wall of the container there is preferably as reinforcement a band of metal or another material surrounding the periphery thereof.

According to a preferred embodiment the container is a drain well, the other dome shape end wall of said container is formed to a reducer of the well.

Figure 1:
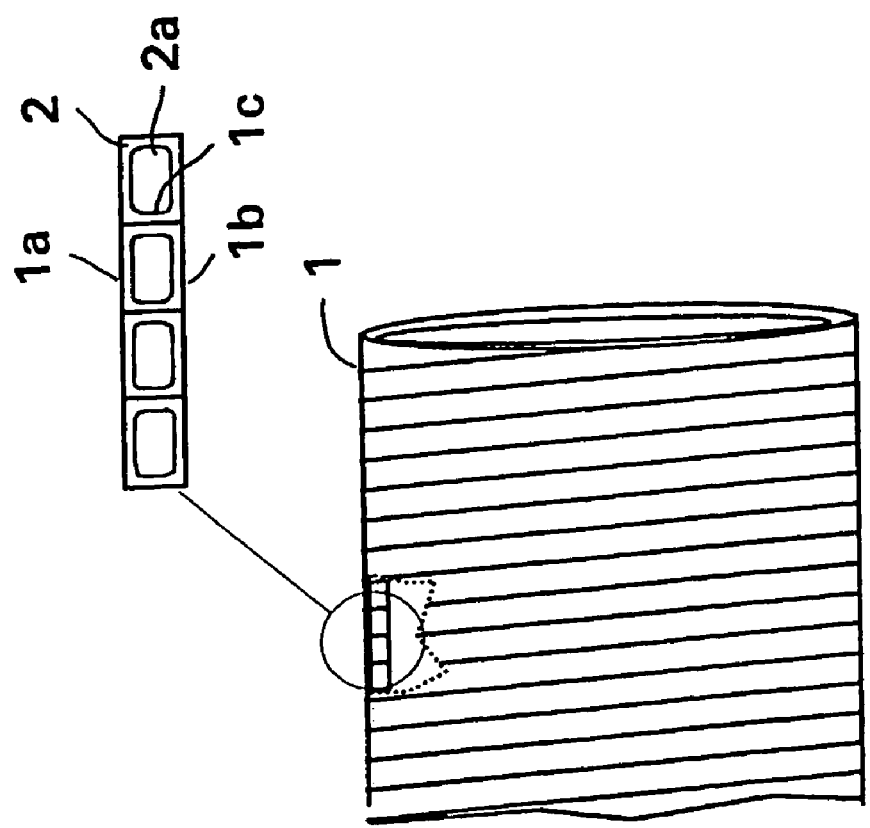
Figure 4:
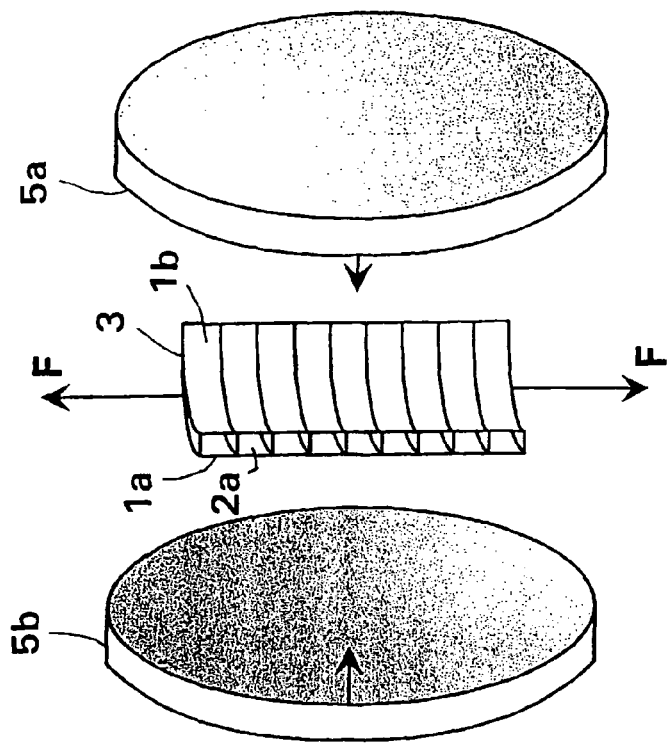
Figure 3:
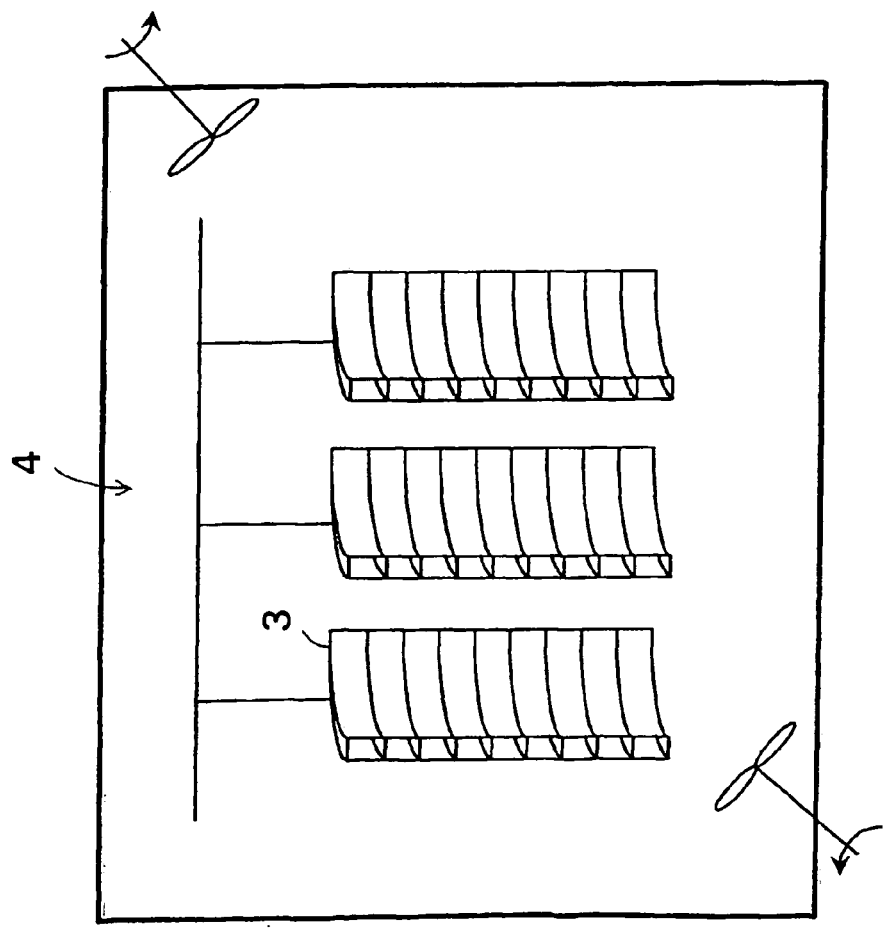

In the following the invention will be disclosed in more detail with reference to the drawings, wherein FIG. 1 discloses an example of a lightweight tube, from which the pre-form of an end wall is to be cut, partly cut;

FIG. 2 discloses perspective view of a pie-form of an end wall cut from a tube according to FIG. 1;

FIG. 3 discloses schematically an example of a convection oven to be used in the invention for heating the pre-forms;

FIG. 4 discloses schematically mould pressing of a pre-form to a dome shaped piece;

FIG. 5 discloses schematically a perspective view of an intermediate form of a mould pressed end wall piece;

FIG. 6 discloses schematically machine-tooling of the edge portion of an end wall piece in conformity with the shape of the end surface of the container mantle;

FIG. 7 discloses an example of a reinforcement solution of the end wall piece, and FIG. 8 discloses a detailed principle view of the fixing of the end wall to the mantle of the container.

Manufacturing of an end wall according to the invention is performed so, that first a large sized lightweight thermoplastics tube 1 is manufactured by spirally winding a thermoplastics hollow profile 2 having a substantially rectangular cross section around a cylindrical rotating drum or a corresponding support and joining adjacent rounds of this hollow profile 2 together for instance by welding, whereby a light-weight tube 1 is achieved comprising an outer wall 1a and an inner wall 1b as well as spirally extending partition wall 1c connecting the aforementioned walls, between which walls there is a similarly spirally extending channel 2a.

From the wall of the thermoplastics tube 1 manufactured as described above a substantially rectangular curved piece is cut to a pre-form 3 for an end wall. Said pre-form 3 is moved for instance to a convection oven 4, wherein it is heated until the thermoplastics pre-form 3 reaches a plastic state. Hereby the pre-form 3 is placed between two mould halves 5a, 5b, one of which is a male mould half 5a with a dome shaped convex mould surface and the other is a female mould half 5b with a dome shaped concave mould surface. In order to secure that the walls 1a and 1b of the pre-form 3 during the mould pressing as exactly as possible will conform to the mould surfaces of the mould halves 5a, 5b and that the cross sections of the longitudinal channels 2a between the walls 1a and 1b will remain unchanged the inner wall 1b of the pre-form can be kept under tension during the mould pressing, as schematically shown by arrows FF in FIG. 4. Further it is preferred that vacuum is maintained between the mould halves 5a and 5b, respectively and the walls 1a and 1b, respectively of the pre-form 3, at least when the mould halves are pushed against each other.

The piece mould to dome shape is cooled while it is pressed between the mould halves 5a, 5b, whereupon it is cut to a dome shaped disc 6 as shown in FIG. 5 with a size of the outer diameter of a container to be manufactured, as is schematically indicated in the left part of FIG. 6. The cutting is preferably performed so that the pre-form 3 is brought into rotation around its central axle whereby a cutting knife 7 is mounted at a distance from said central axle corresponding to the outer diameter of the container to be manufactured. During the same rotating movement or in another working stage a strip having a width corresponding to the thickness of the mantle 8 of a container to be manufactured is cut from the edge of the disc 6 at the inside of the convex outer wall of the disc 6, as schematically shown at the right side of FIG. 6.

The cutter 9 used to machine-tool the edge portion of the end wall piece 6 can preferably have such a shape that it simultaneously cuts an annular groove at the web of the edge of the end wall piece 6 for a reinforcement band 10 of metal, composite or another material surrounding the end wall piece 6.

When the edge portion of the end wall piece 6 has been machine tooled as described above, it is ready to be fixed to the end of the container mantle, which mantle comprise a lightweight tube of the same type as that from which the pre-form 3 of the end wall piece 6 has been cut. The end wall piece 6 is fixed to the mantle preferably by welding an outer 11a and an inner 11b weld seem using a hand extruder and/or an extrusion automat.

The invention claimed is:

1. Method for producing a lightweight end wall of a container characterized by the following stages:
   manufacturing a large size lightweight thermoplastics tube by spirally winding and joining together a hollow profile of thermoplastics;
   cutting a piece from such a tube to form a pre-form of an end wall;
   heating the pre-form into a mouldable state;
   pressing the pre-form into a dome shaped piece between a mail and a female mould-half;
   cooling the dome shaped piece while pressed between the mould-halves;
   machine-tooling the edges of the cooled piece to match the cross-sectional surface of the tube mantle, and
   joining the mantle and the end wall together by welding.

2. Method according to claim 1, characterized in that the pre-form is heating by means of an IR emitter or IR emitters, a convection oven and/or a heated mould.

3. Method according to claim 1, characterized in that while pressing the mould-halves together against the side surfaces of the pre-for vacuum is maintained between each side surface and the moulding surface of the mould-half acting at said side surface.

4. Method according to claim 1, characterized in that the inner surface of the pre-form is tensioned during the pressing stage.

5. Method according to claim 1, characterized in that the mould-halves are tempered.

6. Method according to claim 1, characterized in that machine-tooling of the cooled piece comprises cutting the piece to match the outer mantle of the container followed by removing of plastics material from the edge portion inside the outer wall of the end wall piece a strip corresponding to the thickness of the container mantle.

7. Method according to claim 6, characterized in that before joining together the end wall piece and the mantle of the container the end wall piece is provided with a further reinforcement, wherein the further reinforcement is a band, surrounding the web of the circumferential surface of the end wall piece.

8. Method according to claim 7, characterized in that an annular groove for the reinforcement band is machine-tooled at the web of the circumferential surface of the end wall piece.

9. The method according to claim 7, wherein said band comprises metal.

10. Method according to claim 1, characterized in that the end wall piece is fixed to the mantle of the container by both an inner and an outer weld seam.

11. Method according to claim 10, characterized in that welding is carried out with a hand extruder, an extrusion automat, by a friction welding method, an electro welding method or as butt welding.

12. An unpressurized thermoplastics container the mantle of which being a lightweight tube manufactured from a spirally wound hollow profile and the end wall of which being fixed by welding, characterized in that said end wall is a piece of a wall of a lightweight tube of the same type as the tube forming the mantle of the container mould pressed to dome shape, said piece being cut to match the end of the mantle in such a way that the outer convex wall of said piece forms a flange closing the cavity in the mantle end simultaneously as said mantle closes the open cavities in the dome shaped end wall.

13. Container according to claim 12, characterized in that the end wall of the container is provided with reinforcement in form of a band of metal or another material surrounding the circumferential surface thereof.

14. Container according to claim 12, characterized in that container is a drain well, the other dome shaped end wall of which is formed to a reducer of the well.

* * * * *